United States Patent [19]

Gottlieb

[11] 3,994,539

[45] Nov. 30, 1976

[54] SELF-CONTAINED ACTIVATED SLIDE APPARATUS AND METHODS OF CONSTRUCTING AND UTILIZING SAME

[75] Inventor: Nathan Gottlieb, Southfield, Mich.

[73] Assignee: Robomation Corporation, Southfield, Mich.

[22] Filed: July 22, 1975

[21] Appl. No.: 598,078

[52] U.S. Cl. ............................. 308/3 A; 308/6 R
[51] Int. Cl.² ..................................... F16C 29/04
[58] Field of Search ............ 308/3 R, 3 A, 3.5, 6 R; 92/110, 117, 181, 184; 91/411 B

[56] References Cited
UNITED STATES PATENTS

| | | | |
|---|---|---|---|
| 2,293,134 | 8/1942 | Hallenbeck | 308/3 A |
| 2,385,942 | 10/1945 | Rockwell | 92/117 R X |
| 3,136,230 | 6/1964 | Buckley | 308/3.5 |

*Primary Examiner*—M. H. Wood, Jr.
*Assistant Examiner*—Gene A. Church
*Attorney, Agent, or Firm*—Irving M. Weiner; Pamela S. Austin

[57] ABSTRACT

A self-contained activated slide apparatus of the single or double bar configuration. The apparatus includes a housing which is slidable relative to a bar, or vice versa. The housing may be fixed to an external element, or the bar may be so fixed. The length of the slide stroke may be controlled by the use of stops on single bar slides, and by the use of adjustable end bar assemblies and stops on the two-bar units. The slide apparatus may be activated and controlled from within by the use of a fluid power medium. Slide action may be fully controlled by controlling the pneumatic or hydraulic power source and flow.

5 Claims, 4 Drawing Figures

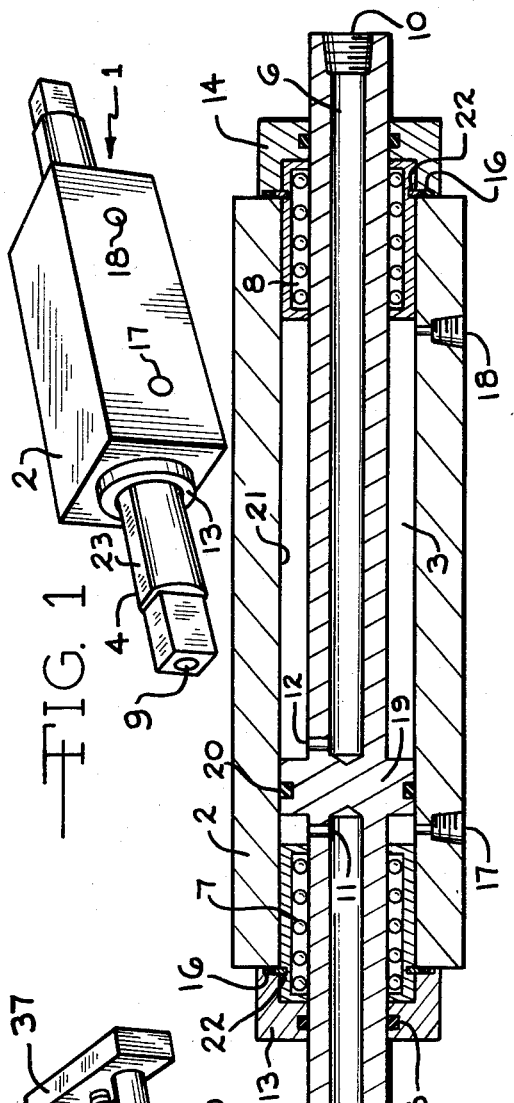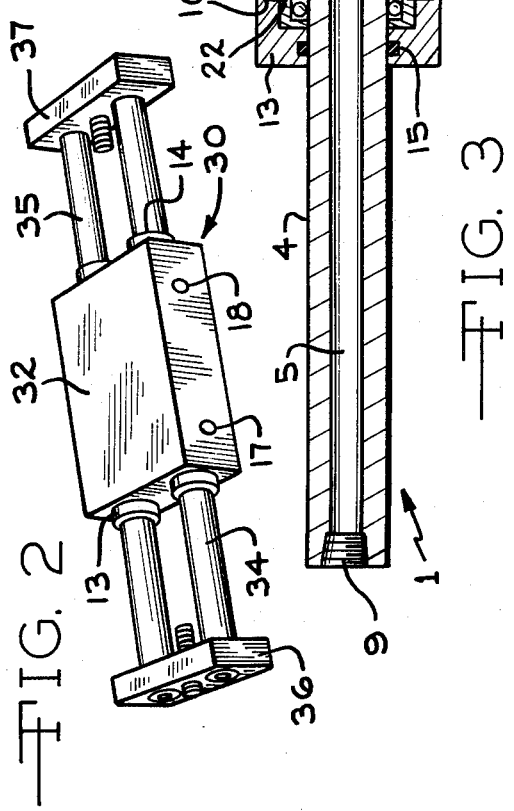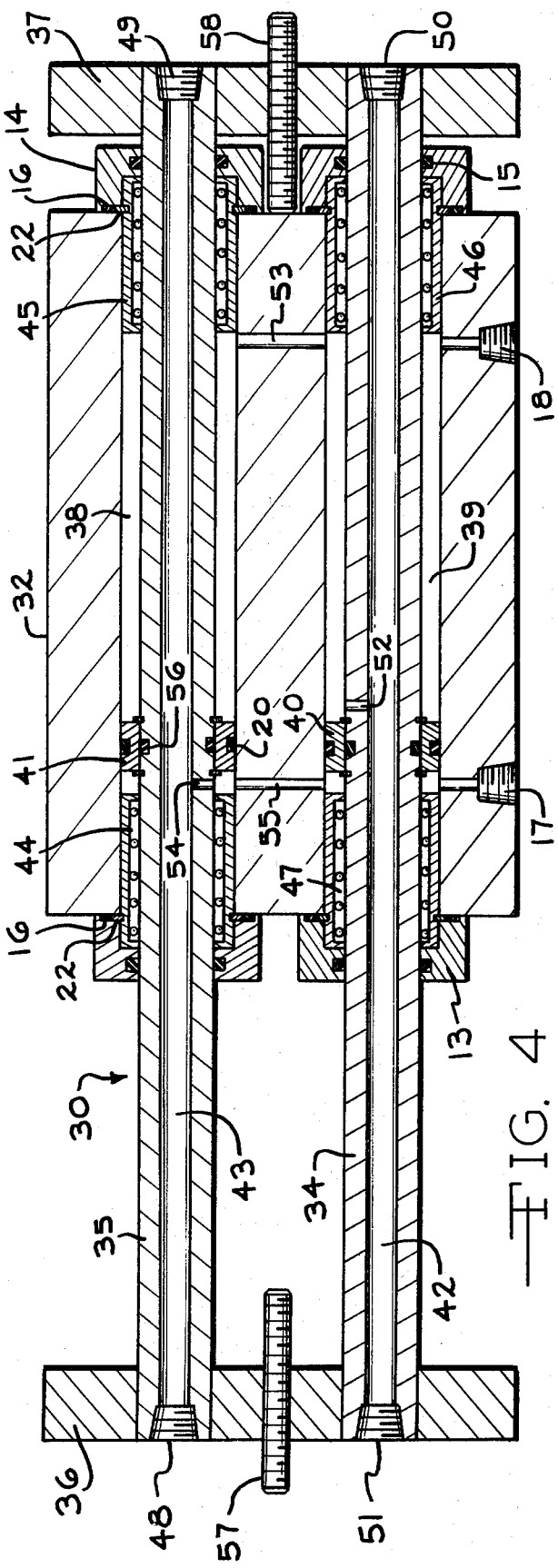

SELF-CONTAINED ACTIVATED SLIDE APPARATUS AND METHODS OF CONSTRUCTING AND UTILIZING SAME

The present invention relates generally to slide apparatuses and methods of constructing and utilizing same. In particular, the present invention relates to a self-contained activated slide apparatus which is activated from within by means of a fluid power medium, and thus permits its use where space and clearances present serious problems.

BACKGROUND OF THE INVENTION

Heretofore, or at least up to the advent of the present invention, there has been a desideratum for precision slide assemblies for use in many applications which require, for example, "in line" movement of machine parts. The requirements of negligible friction and wear to overcome problems of binding and shake, which are normally associated with conventional slide apparatuses, have continually been a matter of difficulty and concern of designers and engineers.

Some conventional slide units incorporate linear ball bearings into compact assemblies combining hardened contact surfaces for minimum wear, rolling elements for low friction, and minimum or zero backlash. Some of such units contain integral seals to exclude foreign matter and retain lubricant. On the other hand, some of such units are available without such seals.

Some of the conventionally-available units consist of a single hardened slide bar having a flat surface ground over its full slide length, two in-line linear ball bearings, and an eccentrically adjustable roller bearing, all assembled into a compact housing. The ends of the slide bar may be provided either with plain ends or with flat square surfaces to facilitate mounting of tools and actuating links. Such slide units combine the compactness of a single slide bar with a feature for eliminating a substantial amount of play or shake between the rolling elements. This is accomplished by means of an eccentric pin and roller bearing contacting the flat surface of the slide bar, and results in the prevention of most, if not all, rotation or play. The housing may incorporate a central lubricating oiler, seals, and mounting holes. Such slide units may be used in applications where compactness, minimum shake, or pre-load of rolling elements is required.

However, where added flexural rigidity and heavier load capacity is required, a two slide bar apparatus may be employed, and is commercially available.

The aforementioned two slide bar units incorporate two slide bars secured rigidly at both ends by plates and passing through two sets of linear ball bearings which are mounted in a housing. Such end plates will permit the mounting of actuating links or tools, or may serve as fixed supports when the housing assembly is used as the sliding member.

Tools or machine parts which require in-line motion may be mounted to such aforementioned conventional slide units either on the surfaces provided at the slide bar ends, or on the housing when the slide bar ends are fixed thus permitting the housing to move. Such conventional slide units may also be used in pairs where off-center loading or actuation does not present the problems associated with conventional dovetails or sleeve bushings.

Without dwelling on a plethora of animadversions concerning the prior art slide mechanism discussed hereinabove, suffice it to say that such mechanisms are inert and require separate devices to operate them. In other words, it is necessary to attach pneumatic, hydraulic, and/or mechanical devices to such conventional slide apparatuses in order to achieve and control the desired movement. However, in many cases and applications there are serious space and clearance problems involved in attempting to interrelate all of the parts, tools and mechanisms required to accomplish the total desired function. It is a primary object of the present invention to accomplish such a result at a minimum of costs, and parts, by providing a slide apparatus which is actuated by a self-contained internal fluid power mechanism.

SUMMARY OF THE INVENTION

The present invention provides a novel and compact slide apparatus which comprises, in combination, first means having a first internal fluid pressure structure, and second means having a second internal fluid power structure. Such first means and such second means are slidable relative to one another. At least a portion of such second means is disposed within said first means. Bearing means are disposed between said first means and said second means. Third means are operably connected to such first and second means for distributing and controlling at least one fluid medium within such first internal fluid pressure structure and such second internal fluid pressure structure to produce relative motion between the first means and the second means.

The term "fluid" as used herein refers to both liquids and gases. The term "fluid power" as used herein includes both hydraulics and pneumatics.

The present invention provides a slide apparatus which functions as an air or hydraulic cylinder.

According to a preferred embodiment of the invention in the single bar slide configuration, the assembly includes a piston rod containing end holes meeting associated orifices, end caps, holding seals, linear ball bearings which are positioned by retainers, and a housing containing predetermined orifices.

It is an object of the present invention to provide a slide apparatus wherein the first means or housing is stationary, while the second means comprising one or more piston rods is movable; and vice versa.

It is a further object of the present invention to provide a slide apparatus which, unlike ordinary fluid cylinders, is capable of supporting substantial radial loads due at least in part to the linear ball bushing bearing assemblies.

It is a further object of the present invention to provide novel slide apparatuses which are pneumatically or hydraulically activated within themselves, and require no external mechanisms other than the pneumatic or hydraulic power source.

Additionally, it is an object of the present invention to reduce the total cost of making a slide operational. Such total cost includes the slide apparatus costs, plus the activating mechanism costs, plus the engineering costs, plus the assembly costs.

Other objects and advantages of the present invention will appear from the following description and appended claims, reference being had to the accompanying drawings forming a part of this specification wherein like reference characters are intended to designate corresponding parts in the several views.

BRIEF DESCRIPTION OF THE DRAWINGS

FIG. 1 illustrates a perspective view of a first possible embodiment of the present invention of the single bar slide configuration.

FIG. 2 represents a perspective view of a second possible embodiment of the present invention of the multiple slide bar configuration.

FIG. 3 illustrates a longitudinal cross-sectional view taken along a horizontal medial plane of the embodiment depicted in FIG. 1.

FIG. 4 illustrates a longitudinal cross-sectional view taken along a horizontal medial plane of the embodiment depicted in FIG. 2.

DETAILED DESCRIPTION OF SOME PREFERRED EMBODIMENTS OF THE PRESENT INVENTION

Before explaining the present invention in detail, it is to be understood that the present invention is not to be limited in its applications or uses to the details of construction and arrangement of parts illustrated in the accompanying drawings, because the present invention is capable of other embodiments, variations and modifications, and of being practiced or carried out in various ways. Furthermore, it is to be understood that the phraseology of terminology employed herein is for the purpose of description and illustration only, and not for the purpose of limitation.

With reference to FIGS. 1 and 3, there is shown a slide apparatus 1, according to a first possible embodiment of the present invention, of the single slide bar configuration. The slide apparatus 1 includes first means, such as a housing 2, having a first internal fluid pressure structure, such as an internal chamber 3. The slide apparatus 1 also includes second means, such as a piston rod 4, having a second internal fluid pressure structure, such as internal chambers 5 and 6.

The housing 2 and the piston rod 4 are slidable relative to one another. The present invention contemplates holding either the housing 2 stationary, or holding the piston rod 4 stationary. At least a portion of the piston rod 4 is disposed within the housing 2.

Bearing means, such as linear ball bearing assemblies 7 and 8, are disposed between the housing 2 and the piston rod 4. Although the bearing means have been illustrated as linear ball bearing assemblies 7 and 8, it should be noted that the present invention contemplates that any suitable bearing means may be employed, including bushings and the like, and the invention is not necessarily limited to the use of linear ball bearing assemblies. Furthermore, although the particular embodiments illustrated in the accompanying drawings show the bearing means affixed to the housing 2, the present invention also contemplates and embraces embodiments wherein the bearing means may be affixed to the piston rod 4 or the multiple piston rods illustrated in FIGS. 2 and 4. The present invention also contemplates the use of bearing means which are not affixed to housing 2 or piston rod 4, but which are freely movable therebetween but constrained in the limits of their motion by suitable stop means.

The slide apparatus 1 also includes third means, such as end orifices 9 and 10, orifices 11 and 12, end caps 13 and 14, holding seals 15 and 16, and orifices 17 and 18, operably connected to the housing 2 and the piston rod 4 for distributing and controlling at least one fluid medium within the chamber 3 and the chambers 5 and 6 to produce relative motion between the housing 2 and the piston rod 4.

As best seen in FIG. 3, the piston rod 4 has an enlarged central section forming a piston 19. The piston 19 is provided with suitable seal means, such as an O-ring or a quad-ring seal 20 which permits motion between the piston 19 and the internal surface 21 of the housing 2 while at the same time providing a suitable fluid seal.

The chambers 5 and 6 within the piston rod 4 are elongated, co-axial passages which terminate at one end thereof at the piston 19, and terminate at the other end thereof in end orifices 9 and 10, respectively. As viewed in FIG. 3, the orifice 11 provides a fluid communicating passage between chamber 5 and the left side of chamber 3 in housing 2. Similarly, the orifice 12 provides a fluid communicating passage between the chamber 6 and the right-hand portion of chamber 3 in housing 2.

Orifice 17 provides a fluid communicating passage between the portion of chamber 3 which is disposed to the left of piston 19 and external fluid apparatus (not shown). Similarly, orifice 18 provides a fluid communicating passage between the portion of chamber 3 which disposed to the right of piston 19 and such external fluid apparatus (not shown). Such external fluid apparatus may take various conventional forms, such as, for example, a two-position four-way valve which is in turn connected to a fluid source and a fluid sump.

In operation, when the device of FIGS. 1 and 3 is to be used with a stationary housing 2, the housing 2 is affixed to a stationary external member or frame (not shown). In such a stationary housing configuration, the orifices 9 and 10 are plugged, and fluid power is alternately supplied through the orifices 17 and 18. The assembly will then act very similar to an ordinary or conventional double-acting double-rod end cylinder. In particular, when pressurized fluid is introduced through orifice 18, it enters the right-hand portion of chamber 3, and from there through the orifice 12 into chamber 6. The pressure exerted by the pressurized fluid on the right side of piston 19 causes the piston 19 and the entirety of piston rod 4 to slide toward the left as viewed in FIG. 3. Meanwhile, any fluid or air to the left piston 19 is permitted to be exhausted through orifice 17.

On the other hand, when orifice 17 serves as the port for introducing the pressurized fluid, and orifice 18 serves as the exhaust port, the piston rod 4 will be moved from left to right as viewed in FIG. 3.

Alternatively, the novel slide apparatus 1 illustrated in FIGS. 1 and 3 can also be utilized in applications where the piston rod 4 is held stationary, while the housing 2 is permitted to slide back and forth. In such a configuration, the orifices 17 and 18 are plugged, and the position rod 4 is suitably anchored or affixed at both ends to some external structure or frame (not shown). The housing 2 is then permitted to be moved by fluid power supplied alternately through the orifices 9 and 10 at the extremities of the piston rod 4. For example, if fluid under pressure is introduced through orifice 10 to fill chamber 6, it will then pass through orifice 12 into the portion of chamber 3 to the right of piston 19 as viewed in FIG. 3. Because the piston rod 4 with its central piston 19 is held stationary, the movable housing 2 will be moved toward the right as viewed in FIG. 3. Meanwhile, any fluid or air in the portion of chamber 3 to the left of piston 19 will be exhausted through orifice 11 and chamber 5, and out through orifice 9 which is temporarily serving as an exhaust port. Similarly, when the pressurized fluid is introduced through orifice 9 and the orifice 10 acts as an exhaust port, the movable housing 2 will be urged to slide or move toward the left as viewed in FIG. 3.

It should be noted in FIG. 3 that adjacent each holding seal 16, there is provided retainers 22 for positioning the linear ball bearing assemblies 7 and 8, respectively, with respect to the associated ends of the housing 2.

With respect to FIG. 1, it should be noted that, if desired, the piston rod 4 can be provided with a pair of upper and lower flat ground surfaces 23.

With reference to FIGS. 2 and 4, there is shown a slide apparatus wherein the second means includes two slide bars or piston rods 34 and 35 secured rigidly at both ends by plates 36 and 37. At least a portion of the piston rods 34 and 35 are slidably disposed within the first means, such as a housing 32, having a first internal fluid pressure structure, such as internal chambers 38 and 39.

Each piston rod 34 and 35 is provided with a piston 40 and 41, respectively, affixed or integral with their associated piston rod. The piston rods 34 and 35 have a second internal fluid pressure structure, such as internal chambers 42 and 43, respectively. Bearing means, such as linear ball bearing assemblies 44, 45, 46 and 47, are disposed between the housing 32 and the piston rods 34, 35.

The slide apparatus 30 also includes third means, such as end orifices 48, 49, 50 and 51, orifices 52, 53, 54 and 55, left end caps 13, right end caps 14, holding seals 15 and 16, and orifices 17 and 18, operably connected to or within the housing 32 and the piston rods 34 and 35 for distributing and contolling at least one fluid medium within the chambers 38, 39, 42 and 43 to produce relative motion between the housing 32 and the piston rods 34 and 35. Each piston 40 and 41 is provided with suitable seal means, such as O-ring or a quad-ring seal 20, which permits motion between the pistons 40 and 41 and the internal surfaces of the chambers 38 and 39 of the housing 32, while at the same time providing a suitable fluid seal.

It should be noted that in this embodiment, the chambers 42 and 43 pass completely through their associated piston rods 34 and 35, respectively. As viewed in FIG. 4, the orifice 52 provides a fluid communicating passage between chambers 39 and 42; the orifice or cross-port 43 provides a fluid communicating passage between the right portions of chambers 38 and 39; the orifice 54 provides a fluid communicating passage between chamber 43 and the portion of the chamber 38 which is disposed to the left of piston 41; and the orifice or cross-port 55 provides a fluid communicating passage between the portions of chambers 38 and 39 which are disposed to the left of pistons 40 and 41.

Orifice 17 provides a fluid communicating passage between an external fluid apparatus (not shown, but mentioned hereinabove in connection with the slide apparatus 1) and the portion of chamber 39 which is disposed to the left of piston 40, as viewed in FIG. 4. Similarly, orifice 18 provides a fluid communicating passage between such external apparatus and the portion of chamber 39 which is disposed to the right of piston 40. Hereagain, such external fluid apparatus may take various conventional forms, such as, for example, a two-position four-way valve which is in turn connected to a fluid source and a fluid sump.

The pistons 40 and 41 may be affixed to their associated piston rods 34 and 35, respectively, by means of suitable retainers 56.

The end plates 36 and 37 may be provided with stop means, such as stop screws 57 and 58, respectively.

In operation, when the slide apparatus 30 of FIGS. 2 and 4 is to be used with stationary piston rods 34 and 35, the end plates 36 and 37 are affixed to a stationary external member or frame (not shown). In such a configuration, the orifices 17, 18, 48 and 51 are plugged, and pressurized fluid, such as air, is introduced through orifice 50 in the right end of piston rod 34. As the fluid fills the chamber 42, the flow continues through orifice 52 pressurizing the right portion of chamber 39, and through cross-port 53 pressurizing the right portion of chamber 38. With the right portion of chambers 38 and 39 pressurized, a force is exerted against the right side of pistons 40 and 41 and against the left-hand side of bearing assemblies 45 and 46 which are affixed to housing 32. Because the pistons 40 and 41 and their associated piston rods 34 and 35, respectively, are fixed stationary, the housing 32 is forced to slide to the right as viewed in FIG. 4 until it is stopped by screw 58. During this movement, any air or other fluid is forced out of the left-hand portion of chambers 38 and 39 through cross-port 55, orifice 54, chamber 43, and orifice 49. Similarly, when orifice 50 serves as the exhaust port and orifice 49 serves as the port for introducing pressurized fluid, the housing 32 will move in the opposite direction.

Alternatively, the novel slide apparatus 30 may also be utilized, if desired, in applications where the housing 32 is held stationary, while the piston rods 34 and 35 are permitted to slide back and forth as a unit. In such applications, the orifices 17 and 18 are used alternately for introducing pressurized fluid and exhausting same, while orifices 48, 49, 50 and 51 are plugged.

The present invention has been described in connection where the bearing means have been affixed to the housing 2 or 32. However, the invention also contemplates embodiments wherein the bearing means is affixed to the piston rods, or is free floating within suitable restraints or limits.

In addition, the present invention also contemplates embodiments wherein more than one or two piston rods are employed.

The present invention is not restricted to piston rods or chambers having circular cross sections. On the other hand, the present invention does contemplate piston rods and the aforementioned chambers which have non-circular cross sections, such as ellipses, and combination straight and arcuate surfaces. Indeed the chambers and piston rods shown in FIGS. 3 and 4 are not to be taken as circular in cross section.

It will be evident from the description set forth hereinabove that there is herein provided novel apparatuses which satisfy all of the objects of the present invention, as well as others, including many advantages which are of great practical utility and commercial importance.

Furthermore, because many embodiments may be made of this inventive concept, and because many modifications and variations may be made of the particular embodiments hereinbefore shown and described in detail, it is to be understood that all matter herein is to be interpreted merely as illustrative and not in a limiting or restricting sense.

I claim:
1. A slide apparatus comprising, in combination:
first means having a first internal fluid pressure structure;
second means having a second internal fluid pressure structure;
said first means and said second means being slidable relative to one another;
at least a portion of said second means being disposed within said first means;
bearing means disposed between said first means and said second means;
third means operably connected to said first and second means for distributing and controlling at least one fluid medium within said first internal fluid pressure structure and said second internal fluid pressure structure to produce relative motion between said first means and said second means;
said second means includes at least one piston rod;
each said piston rod is provided with said second internal fluid pressure structure which includes at least one internal chamber formed within said piston rod;
each said piston rod is provided with a piston disposed substantially at the central portion of said piston rod; and
said third means includes at least one passage disposed adjacent said piston for providing fluid communication between said first internal fluid pressure structure of said first means and said second internal pressure structure of said second means.

2. A slide apparatus characterized substantially in accordance with claim 1, wherein:
said second internal fluid pressure structure includes a first chamber extending from a first end of said piston rod to said piston and a second chamber extending from the opposite end of said piston rod to said piston; and
said first and second chambers terminating at said piston.

3. A slide apparatus characterized substantially in accordance with claim 2, wherein:
said second internal fluid pressure structure includes a continuous chamber formed within the interior of said piston rod and extending from one end of said piston rod to the other end thereof.

4. A slide apparatus characterized substantially in accordance with claim 3, wherein:
said first means includes a housing;
said first internal fluid pressure structure includes two elongated chambers;
said second means includes two piston rods which have their extreme ends connected together by end plates;
said second internal fluid pressure structure includes a first continuous chamber formed within the interior of a first of said piston rods, and a second continuous chamber formed within a second of said piston rods;
each said piston rod is provided with a piston disposed substantially at the central portion of its associated piston rod;
said housing and said piston rods being slidable relative to one another;
at least a portion of said piston rods is disposed within said housing;
said bearing means includes linear ball bearing assemblies affixed within said housing and contacting the outer surfaces of said piston rods;
said linear ball bearing assemblies being disposed at the ends of each of said elongated chambers within said housing;
each said end plates being provided with adjustable stop means;
said third means includes a first passageway providing a fluid communication path between a first of said elongated chambers within said housing and said first continuous chamber formed within said first piston rod;
said third means includes a second passageway providing a fluid communication path between said elongated chambers within said housing;
said third means including a third passageway providing a fluid communications path between the other elongated chamber within said housing and said second continuous chamber within said second piston rod;
said third means including a fourth passageway providing a fluid communications path between said elongated chambers within said housing at a location remote from said second passageway;
said third means including a fifth passageway providing a fluid communication path between said first elongated chamber within said housing and the exterior of said housing;
said third means including a sixth passageway providing a fluid communications path between the exterior of said housing and said first elongated chamber within said housing at a location remote from said fifth passageway;
said third means including seventh and eighth passageways provided at the ends of said first piston rod; and
said third means also including eighth and ninth passageways provided at the ends of said second piston rod.

5. A slide apparatus comprising, in combination:
first means having a first internal fluid pressure structure;
second means having a second internal fluid pressure structure;
said first means and said second means being slidable relative to one another;
at least a portion of said second means being disposed within said first means;
bearing means disposed between said first means and said second means;
third means operably connected to said first and second means for distributing and controlling at least one fluid medium within said first internal fluid pressure structure and said second internal fluid pressure structure to produce relative motion between said first means and said second means;
said first means includes a housing;
said first internal fluid pressure structure includes an elongated chamber formed within the interior of said housing;
said second means comprises a single piston rod having a piston disposed substantially centrally along said piston rod;
said second internal fluid pressure structure including a first chamber extending from said piston to a first end of said piston rod, and a second chamber extending from said piston to a second end of said piston rod;

said housing and said piston rod being slidable relative to one another;

at least a portion of said piston rod is disposed within said housing said bearing means is affixed to said housing and contacts the outer surface of said piston rod;

said third means includes a first passageway providing a fluid communication path between said elongated chamber within said housing and the exterior of said housing;

said third means includes a second passageway providing a fluid communication path between the exterior of said housing and said elongated chamber within said housing at a location remote from said first passageway;

said third means also includes a third passageway providing a fluid communication path between said elongated chamber within said housing and said first chamber within said piston rod; and said third means includes a fourth passageway providing a fluid communications path between said elongated chamber within said housing and said second chamber within said piston rod.

* * * * *

UNITED STATES PATENT AND TRADEMARK OFFICE
CERTIFICATE OF CORRECTION

PATENT NO. : 3,994,539

DATED : November 30, 1976

INVENTOR(S) : Nathan Gottlieb

It is certified that error appears in the above-identified patent and that said Letters Patent is hereby corrected as shown below:

Column 7, line 43, (claim 3, line 2) change "2" to --1--.

Signed and Sealed this

Twelfth Day of April, 1988

Attest:

DONALD J. QUIGG

*Attesting Officer*    *Commissioner of Patents and Trademarks*

REEXAMINATION CERTIFICATE (631st)
United States Patent [19]

Gottlieb

[11] B1 3,994,539

[45] Certificate Issued Feb. 10, 1987

[54] SELF-CONTAINED ACTIVATED SLIDE APPARATUS AND METHODS OF CONSTRUCTING AND UTILIZING SAME

[76] Inventor: Nathan Gottlieb, 27406 Pierce, Southfield, Mich. 48076

Reexamination Request:
No. 90/000,908, Nov. 15, 1985

Reexamination Certificate for:
| | |
|---|---|
| Patent No.: | 3,994,539 |
| Issued: | Nov. 30, 1976 |
| Appl. No.: | 598,078 |
| Filed: | Jul. 22, 1975 |

[51] Int. Cl.[4] .............................................. F16C 29/04
[52] U.S. Cl. ..................................................... 384/49
[58] Field of Search ........................ 92/66, 61; 384/49

[56] References Cited

U.S. PATENT DOCUMENTS

| | | | |
|---|---|---|---|
| 2,293,134 | 8/1942 | Hallenbeck | 384/42 |
| 2,385,942 | 10/1945 | Rockwell | 121/41 |
| 3,136,230 | 6/1964 | Buckley | 92/128 |
| 3,274,893 | 9/1966 | Hurlow . | |
| 3,457,840 | 7/1969 | Grimes . | |
| 3,772,966 | 11/1973 | Mills | 92/66 |

*Primary Examiner*—Lenard A. Footland
*Attorney, Agent, or Firm*—Irving M. Weiner; John J. Cantarella; Joseph P. Carrier

[57] ABSTRACT

A self-contained activated slide apparatus of the single or double bar configuration. The apparatus includes a housing which is slidable relative to a bar, or vice versa. The housing may be fixed to an external element, or the bar may be so fixed. The length of the slide stroke may be controlled by the use of stops on single bar slides, and by the use of adjustable end bar assemblies and stops on the two-bar units. The slide apparatus may be activated and controlled from within by the use of a fluid power medium. Slide action may be fully controlled by controlling the pneumatic or hydraulic power source and flow.

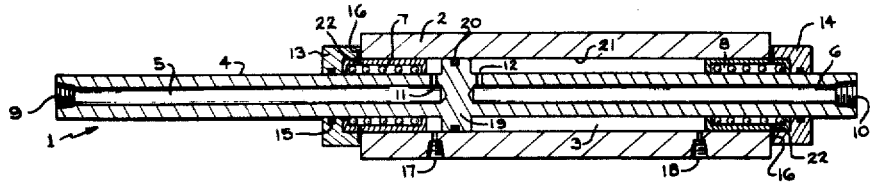

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3-5 is confirmed.

Claims 1 and 2 are cancelled.

* * * * *